US011053912B2

(12) United States Patent
Oelofse (10) Patent No.: US 11,053,912 B2
(45) Date of Patent: Jul. 6, 2021

(54) WIND TURBINE FOR FACILITATING LAMINAR FLOW

(71) Applicant: MAGNELAN TECHNOLOGIES INC., Westlake Village, CA (US)

(72) Inventor: Rudolph Oelofse, Seattle, WA (US)

(*) Notice: Subject to any disclaimer, the term of this patent is extended or adjusted under 35 U.S.C. 154(b) by 55 days.

(21) Appl. No.: 16/160,525

(22) Filed: Oct. 15, 2018

(65) Prior Publication Data

US 2019/0316566 A1    Oct. 17, 2019

Related U.S. Application Data

(63) Continuation of application No. 14/290,812, filed on May 9, 2014, now Pat. No. 10,100,809, which is a continuation-in-part of application No. 14/290,741, filed on May 29, 2014, now Pat. No. 10,033,314.

(60) Provisional application No. 61/828,410, filed on May 29, 2013.

(51) Int. Cl.
   *F03D 3/06* (2006.01)

(52) U.S. Cl.
   CPC ............ *F03D 3/064* (2013.01); *F03D 3/061* (2013.01); *F05B 2240/301* (2013.01); *Y02B 10/30* (2013.01); *Y02E 10/72* (2013.01); *Y02E 10/74* (2013.01)

(58) Field of Classification Search
   CPC .... F03D 3/061; F03D 3/064; F05B 2240/301; F05B 2240/211; Y02E 10/74
   See application file for complete search history.

(56) References Cited

U.S. PATENT DOCUMENTS

| 4,180,372 A | * | 12/1979 | Lippert, Jr. | ........... F03D 7/0252 416/132 B |
| 4,229,661 A | | 10/1980 | Mead et al. | |
| 4,449,053 A | | 5/1984 | Kutcher | |

(Continued)

FOREIGN PATENT DOCUMENTS

| CN | 1767976 A | 5/2006 |
| FR | 2863319 B1 | 6/2005 |

(Continued)

OTHER PUBLICATIONS

True Bridge Composites Inc: "Power Solution Wind Power, Everything in Our World Starts with Energy, Improving Life Through Responsible Technologies," Specification for the TN Vertical Axis Wind Turbine dated Mar. 30, 2012.

(Continued)

*Primary Examiner* — Woody A Lee, Jr.
*Assistant Examiner* — Maxime M Adjagbe
(74) *Attorney, Agent, or Firm* — Patterson Intellectual Property Law, P.C.; Gary L. Montle (57) ABSTRACT

Vertical axis wind turbines are provided having foil design and geometry that facilitates lift, torque and laminar flow along a 360 degree radial. Contemplated foils are non-planar, and have a chord length that is at least three times greater than a distance between a trailing end of a leading foil, and a leading end of a trailing foil. Additionally or alternatively, the foils are located away from a turbine axis at a distance that is about 2.9-3.5 times greater than a chord length of the foils. In some embodiments, the foils are circumferentially distributed via one or more laminar stall vanes.

17 Claims, 4 Drawing Sheets

(56) References Cited

U.S. PATENT DOCUMENTS

| | | | |
|---|---|---|---|
| 6,465,899 B2* | 10/2002 | Roberts | F03D 3/0427 |
| | | | 290/44 |
| 6,519,780 B2 | 2/2003 | Goodwin | |
| 7,303,369 B2 | 12/2007 | Rowan et al. | |
| 7,329,099 B2 | 2/2008 | Hartman | |
| 7,329,965 B2 | 2/2008 | Roberts et al. | |
| 7,417,334 B2* | 8/2008 | Uchiyama | H02K 7/14 |
| | | | 290/55 |
| 7,719,147 B2 | 5/2010 | Palmer, Jr. et al. | |
| 7,960,852 B2 | 6/2011 | Cumings et al. | |
| 8,128,337 B2 | 3/2012 | Pezaris | |
| 8,193,657 B2 | 6/2012 | Paluszek et al. | |
| 8,400,038 B2 | 3/2013 | Smith et al. | |
| 8,403,641 B2 | 3/2013 | Gay | |
| 8,648,483 B2 | 2/2014 | Haar | |
| 10,033,314 B2 | 7/2018 | Oelofse | |
| 10,038,349 B2 | 7/2018 | Long et al. | |
| 2003/0112105 A1 | 6/2003 | Post | |
| 2003/0175089 A1 | 9/2003 | Almind | |
| 2007/0253824 A1 | 11/2007 | Eyb | |
| 2009/0016884 A1 | 1/2009 | Yan | |
| 2009/0224552 A1 | 9/2009 | Sulentic | |
| 2010/0071301 A1 | 3/2010 | Herrius de Roest | |
| 2010/0111689 A1 | 5/2010 | Davis | |
| 2010/0140949 A1 | 6/2010 | Pitre et al. | |
| 2010/0295316 A1* | 11/2010 | Grassman | F03D 3/005 |
| | | | 290/55 |
| 2010/0308765 A1 | 12/2010 | Moore et al. | |
| 2011/0115223 A1 | 5/2011 | Stahlkopf et al. | |
| 2011/0183094 A1 | 7/2011 | Blomqvist | |
| 2011/0206526 A1* | 8/2011 | Roberts | F03D 3/02 |
| | | | 416/223 R |
| 2011/0280708 A1 | 11/2011 | Cochrane | |
| 2012/0019235 A1 | 1/2012 | Post | |
| 2012/0141295 A1 | 6/2012 | Martinez De Castarieda et al. | |
| 2013/0017084 A1 | 1/2013 | Anderson | |
| 2013/0115069 A1 | 5/2013 | Zha et al. | |
| 2013/0183164 A1 | 7/2013 | Silvert et al. | |
| 2014/0356180 A1 | 12/2014 | Oelofse | |
| 2017/0022967 A1 | 1/2017 | Hökelek | |
| 2018/0057176 A1 | 3/2018 | Kinlen et al. | |

FOREIGN PATENT DOCUMENTS

| | | |
|---|---|---|
| WO | 2010048152 A1 | 4/2010 |
| WO | 2011139396 A1 | 11/2011 |
| WO | 2011144830 A1 | 11/2011 |
| WO | 2016176352 A1 | 11/2016 |
| WO | 2017014993 A1 | 1/2017 |
| WO | 2017089047 A1 | 6/2017 |

OTHER PUBLICATIONS https://web.archive.org/web/20130723164027/http:/www.revairwind.com/gallery/.

Rooij, Ruud Van et al: "Design of Airfoils for Wind Turbine Blades," DUWIND, section Wind Energy, Faculty CiTG, Delft University of Technology, pp. 1-31, May 3, 2004, The Netherlands.

"VAWT DS-3000W Vertical Axis Wind Turbines." Hi, http://www.hi-vawt.com.tw/en/ds3000w.html.

Brown, Matthew: "Vertical Axis Wind Turbines." Submitted as coursework for PH240, Stanford University, Fall 2016.

* cited by examiner

WIND TURBINE FOR FACILITATING LAMINAR FLOW

This application is a continuation in part of U.S. application Ser. No. 14/290,741, filed on May 29, 2014, which claims priority to 61/828,410, filed May 29, 2013. These and all other extrinsic materials identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is wind power technologies.

BACKGROUND

The background description includes information that may be useful in understanding the present invention. It is not an admission that any of the information provided herein is prior art or relevant to the presently claimed invention, or that any publication specifically or implicitly referenced is prior art.

In recent years, the demand for renewable and clean sources of energy has dramatically increased. With this increase in demand, many efforts have been placed towards improving the efficiency of electricity generating wind turbines, which are powered by solar (wind) energy.

Most existing wind turbines are one of two types: (1) horizontal-axis wind turbines, or (2) vertical axis wind turbines. While horizontal-axis wind turbines are the most common throughout the world, vertical axis wind turbines are growing in popularity because they are less expensive to construct and maintain, and do not need to be positioned towards the wind, which makes them very useful in areas with varying wind directions.

In the prior art, vertical axis wind turbine foils are designed to operate in a drag configuration (Savonius design) or in a lift configuration (Darrieus design). Some examples of known vertical axis wind turbines can be found in International Patent Application Publication No. WO 2010/048,152, U.S. Patent Application Publication Nos. 2013/0115069 and 2009/0224552, and U.S. Pat. Nos. 7,303,369, 7,329,965, 7,960,852, 8,128,337, and 8,193,657.

Other examples of vertical axis wind turbines include Applicant's own wind turbines (See e.g., www.revairwind.com/gallery/) and True North Bridged Composites Inc.'s wind turbines (See e.g., "Power Solution Wind Power, Everything In Our World Starts With Energy, Improving Life Through Responsible Technologies," a power point presentation dated Mar. 30, 2012) each of which utilized lift-based foils designed to fly in a straight line and having a flat high pressure side (other than an air brake), and failed to appreciate turbine geometries to facilitate laminar flow.

Unfortunately, prior efforts apparently failed to appreciate foil designs and turbine geometries that facilitate laminar flow between foils, enhance torque, and increase efficiency.

Thus, there is still a need for improved wind power technologies.

SUMMARY OF THE INVENTION

The inventive subject matter provides apparatus, systems and methods in which circular-oriented foils are designed and arranged to facilitate a laminar flow there between. Foil shape and orientation within turbines of the inventive subject matter are such that the foils can only fly in a circle, and will maintain the laminar air flow throughout the entire circumference of the turbine. As incorporated into the turbines, each of the foils uses little or no true wind to provide power to the turbine, but instead is driven entirely or almost entirely by the laminar flow slip stream from a preceding (i.e., leading) foil, which laminar flow is created by the specific geometries of the foils and wind turbine.

Design of the foils of the inventive subject matter is the result of foil testing in a water environment, which is approximately 870 times denser than air. In the water environment, the Applicant manipulated and controlled the environment behind foils (i.e., the environment that a trailing foil could fly in), and surprisingly discovered unique characteristics of space, geometry, and direction of the environment behind a foil under a load. It should be noted that while some catamarans now incorporate solid adjustable foils that attempt to stay within a created laminar flow environment, they do not incorporate the fixed geometries and controlled operating environment of the current inventive subject matter.

Viewed from another perspective, applicant has surprisingly discovered that a substantially vertical axis wind turbine can achieve superior performance through use of several non-planar foils, having an R1:C1 ratio of between 2.9 and 3.5, and a C1:S ratio of at least 3:1, measured at rest (wherein R1=distance from the turbine axis to a first foil's leading edge; C1=chord length of first foil; and S=distance between a first foil and a second, trailing foil). As used herein, the term "substantially vertical axis" means an axis that is oriented within at least 30° off vertical.

In most contemplated embodiments, the foils are circumferentially distributed about the axis using one or more laminar flow vanes As the foils rotate about the axis, each of the foils is a leading foil relative to the foil trailing immediately behind it, and is also a trailing foil relative to the foil immediately in front of it. Each of the foils has a leading edge at a specified distance (R1 for first foil, R2 for second foil . . . Rn for nth foil) from the axis. R2-Rn are each preferably within 20% of R1, and more preferably within 10% of R1. Additionally, each foil of a turbine has a chord (C1 for first foil, C2 for second foil . . . Cn for nth foil). C2-Cn are each preferably within 200% of C1, and more preferably within 10% of C1. Additionally or alternatively, each foil can advantageously be designed to fly in a circular path because it is largely non-planar on the high pressure side of the foil. Viewed from another perspective, each foil can have a high pressure portion that is entirely or substantially curved (i.e., along at least 90% of the high pressure portion) in a manner that facilitates laminar flow.

A turbine of the inventive subject matter could be made of any suitable material. In preferred embodiments, the turbine is made entirely or substantially or one or more composite materials (e.g., composite fiber resin infused, hybrid epoxy vinyl ester resins and biaxial or triaxial composite materials laminated to high performance cores, etc.). It should be appreciated that a composite material is any material made from two or more constituent materials with significantly different physical or chemical properties (e.g., fiber and resin), that when combined, produce a material with characteristics significantly different from any of the individual components.

Turbines of the inventive subject matter can comprise any suitable number of foils that are supported via any suitable number of laminar stall vanes that control or facilitate a laminar flow. Contemplated turbines can additionally or alternatively comprise one or more of each of the following: a stator ring that assists in supporting the weight of the turbine, a mast or frame base to which a stator ring could be attached, a magnetic linear axial flux generator (e.g., magnets and coils) that converts kinetic energy into electrical energy, and a magnetic slice motor.

Various objects, features, aspects and advantages of the inventive subject matter will become more apparent from the following detailed description of preferred embodiments, along with the accompanying drawing figures in which like numerals represent like components.

DETAILED DESCRIPTION

The following description includes information that may be useful in understanding the present invention. It is not an admission that any of the information provided herein is prior art or relevant to the presently claimed invention, or that any publication specifically or implicitly referenced is prior art.

Applicant has invented lift-based vertical axis wind turbines that have laminar flow foils, and are at least 50%, more preferably at least 70%, or even more preferably at least 80% efficient, or even 110% efficient (where efficiency is determined with respect to the Betz limit—a rule that no turbine can capture more than 59.3% of the kinetic energy in wind). Turbines of the inventive subject matter surpass Betz law/limit because the foils generate power throughout the 360 degree radial (e.g., downwind, crosswind, upwind, etc.) via their unique geometry and spacing. More specifically, Betz law calculations do not apply to turbines of the inventive subject matter where each foil is traveling through a preceding foil's laminar flow slip stream. Contemplated turbines can be especially useful in sites where wind direction is highly variable, and can provide power to, among other things, a domestic power supply, electrical grids, farms, schools, buildings, military bases, field and outpost operations, field telecommunications, remote mining and oil fields, resorts, water treatment plants, wineries, businesses, hotels and resorts, airports, remote job sites, mills, sports arenas, or islands.

As will become more apparent with the description below, it is contemplated that turbines of the inventive subject matter can begin producing power as soon as there is even relatively slight air movement, creating considerably more power from a given wind velocity than prior art turbines, while also enhancing operating parameters. There is no shut down or cut-out speed even in high velocity winds as the foils are designed to self-regulate in high winds. The foil geometry is such that each leading foil allows the laminar flow to start separating from the high pressure side of the foil, thereby creating a turbulent buffeted airmass for a trailing foil to travel into. This turbulent buffeted airmass prevents the trailing foil from overspeeding. Thus, overspeeding of the generator can be automatically avoided, without any additional brakes or other controls. Preferred turbines are designed to function in an extended operating range, while generating power at a higher rate of efficiency than both bladed mill designs and drag-based vertical turbines.

Figure 1:
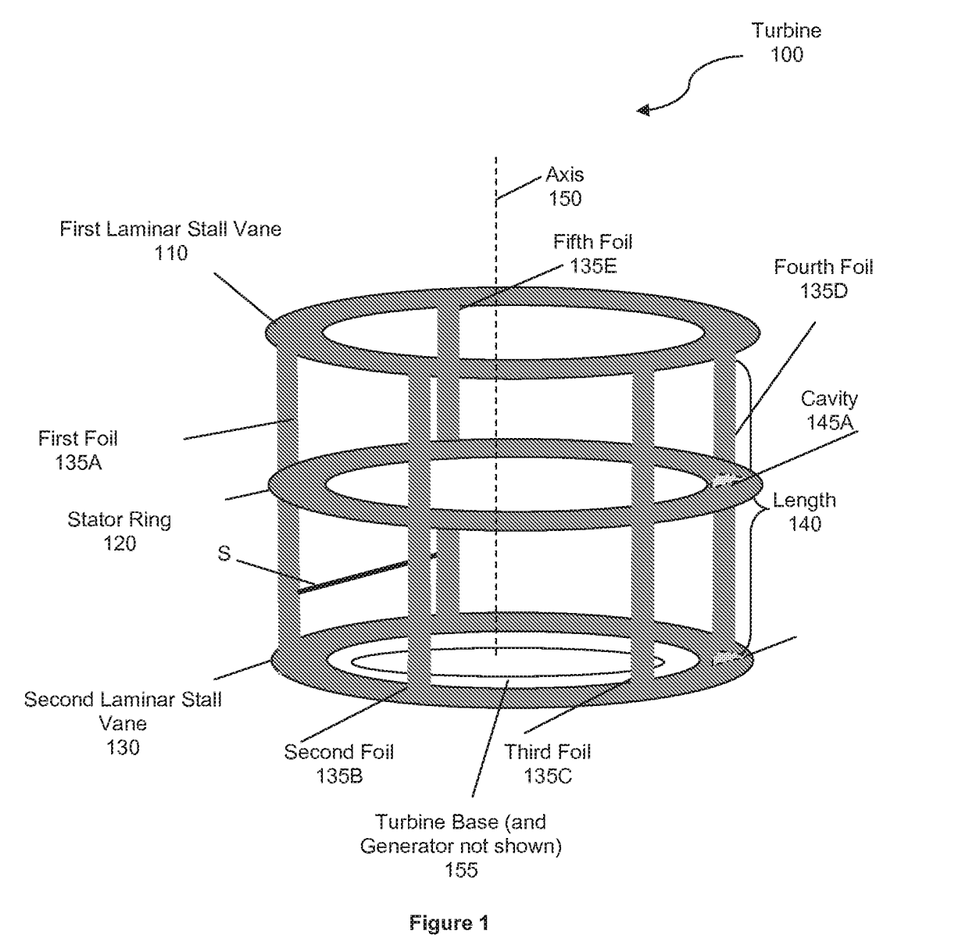
FIG. 1 illustrates the upper part of a vertical axis wind turbine of the inventive subject matter.

FIG. 1 illustrates an embodiment of a vertical axis wind turbine 100 of the inventive subject matter. Turbine 100 comprises first and second laminar stall vanes (110 and 130, respectively), and a stator ring 120, some or all of which include cavities (through-holes or recesses) (e.g., 145A, 145B) that are sized and dimensioned to hold a foil (e.g., fourth foil 135D) in proper position and angle of attack relative to another foil (e.g., fifth foil 135E or third foil 135C). The angle of attack of a foil could be anywhere between −30 degrees and 30 degrees, more preferably between −20 degrees and 20 degrees, and even more preferably between −5 degrees and 5 degrees, where the foil chord line is deemed to be 0 degrees. While all previously known vertical axis wind turbine foils are apparently designed to fly in a linear path because of their flat or convex high pressure sides, the high pressure sides of the foils of the inventive subject matter are concave, and the leading edges of the foils preferably incorporate micro tracks to create micro vortices along the boundary layer on the low pressure side so that the laminar flow is maintained as the lift vector moves back and forth across the low pressure side of the foil in rotation about axis 150. This accelerates the air mass into the low pressure area and increases the angle of attack over a much broader range while maintaining the laminar flow without stall.

As shown, turbine 100 includes five wing-shaped foils (135A, 135B, 135C, 135D, 135E), each having the same or substantially the same (i.e., within 90% of) length (e.g., 140), and configured by their concave high pressure sides to fly or otherwise move or rotate about axis 150. In that manner each of the foils shown is designed to fly within the laminar flow of a preceding path of the leading foil while rotating in a circle. As further described below with respect to FIG. 2, the laminar flow is further accelerated by tip design of the trailing edge on the high pressure side of the foil. Viewed from another perspective, the turbulent energy that normally falls of the wing tips, thereby creating drag and wing tip vortices, is harnessed and directed in order to channel and stabilize the laminar flow for the following foil. This angular velocity slipstream determines the distance from center chord length of a leading foil to the center of the chord length of the following foil, and thus determines the space geometry in which the foils fly.

While some preferred turbines will include five foils, it should be appreciated that a turbine of the inventive subject matter could comprise any suitable number of foils (e.g., 3, 4, 5, 6, 7, 8, or even 10 or more) depending on, among other things, the diameter of the turbine. For example, it is contemplated that more than 5 foils may be advantageous to create a 360 degree radial laminar flow with turbines having large diameters (e.g., greater than 30 feet).

The distance between the trailing end of one foil (e.g., first foil 135A) and the leading end of another foil (e.g., fifth foil 135D) is labeled in FIG. 1 with the letter S. It is contemplated that this distance will preferably be the same or substantially the same between each pair of leading and trailing foils. Thus, the foils are preferably spaced evenly about a circumference of the turbine.

Also illustrated in FIG. 1 is stator ring 120, which can assist in capturing wind more effectively to thereby increase the apparent wind activity. It should be appreciated that a laminar stall vane or stall fence vane can facilitate or create a lift by forcing air mass perpendicular to its original flow direction.

Turbine 100 further includes a second laminar stall vane 130 coupled to a turbine base (e.g., a ring-shaped base) 155 that is configured to attach to, or otherwise couple with, one or more coils of a generator assembly. Generator assemblies will be described in further detail in connection with FIGS. 3 and 4.

Figure 2:
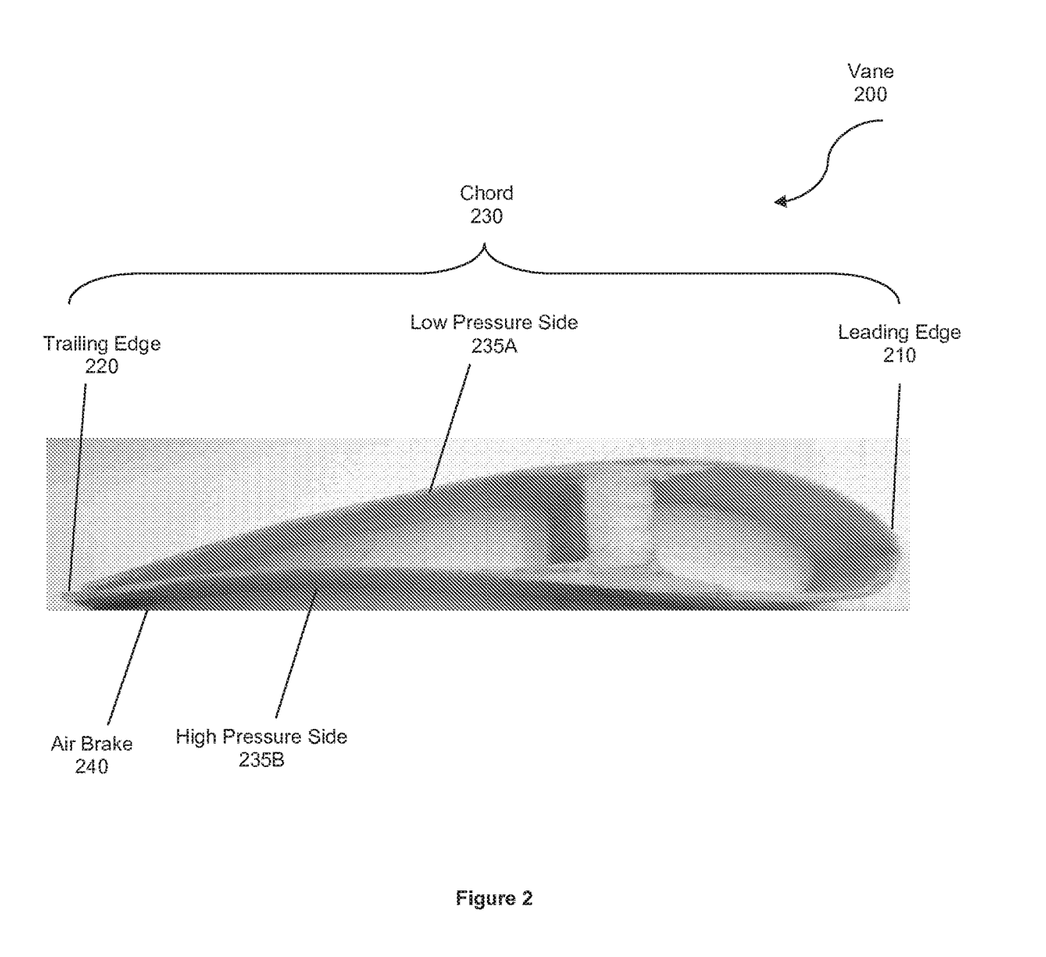
FIG. 2 is a cross-sectional view of a foil of the turbine of FIG. 1.

FIG. 2 is a cross-sectional view of a wing-shaped foil 200 of the inventive subject matter, which is designed to facilitate or create a laminar flow similarly to foils 135A-E above. Foil 200 comprises a leading edge 210, a trailing edge 220, a low pressure side 235A, a high pressure side 235B, and an air brake 240 configured to maintain constant rotational speed at a given temperature and density. Additionally, foil 200 has a chord length (chord 230), which represents the length of a straight line connecting leading edge 210 and trailing edge 220.

In some embodiments, leading and trailing foils are shaped and positioned such that the turbine responds to a flow of fluid (e.g., wind) by spinning with a tangential velocity greater than the velocity of the fluid against the turbine. In this manner the foils can move faster than the wind that hits them.

Foils (e.g., foil 200) included in turbines of the inventive subject matter are advantageously of a non-planar, cambered design, and are designed to fly in a circle while maintaining laminar flow throughout the 360 degree radial. Additionally, the foils are sized, shaped and positioned to maintain lift and torque throughout the 360 degree radial without significant air mass cavitation, which makes the turbine extremely quiet in all operating wind conditions (for example, less than 32 dB).

Another advantageous feature of contemplated foils is that they can operate in a dimension where the angle of attack of the wind is constantly changing. As discussed above, the foils do not fly in true linear wind, but rather they fly in the laminar flow of the created wind (i.e., the apparent wind) of the preceding foil. Maintaining of laminar flow throughout the 360 degree radial allows the foil to maintain lift. This eliminates the need for a stall start up sequence, which allows for a very wide window for creating torque energy. The clean laminar airflow created by the Applicant's foils (e.g., by a leading foil) is the medium in which the foils (e.g., a trailing foil) fly or otherwise rotate about an axis. The accelerated lift that is developed by the foils can create the torque used in the turbine. Preferably, this torque exists around the entire circumference of the turbine.

Viewed from another perspective, foils of the inventive subject matter are designed to allow for the lift vector from the low pressure to move freely from the leading edge to the trailing edge across the low pressure side while maintaining a laminar flow at all angles of attack. Additionally or alternatively, it is contemplated that foils can be shaped, sized and positioned in a turbine such that laminar flow velocity is ≥2×, more preferably ≥3×, and even more preferably ≥4× of the impending wind velocity.

In some embodiments, the foils are configured such that the high pressure side has a low pressure component aft of the chord (e.g., an elongated air brake), which accelerates the laminar flow and maintains the boundary layer across the full range while flying in a 360 degree radial without stalling. On the other hand, the size and placement of the low pressure component can separate the laminar boundary layer at a certain velocity, which causes a cavitation pocket that tends to destroy the laminar flow. This acts as a built-in air brake so that the foil will not overspeed as smooth laminar flow slipstream is lost, and turbulent airmass is created—an environment in which the following foil would function inefficiently. This safety feature is provided without gearboxes or external devices.

Figure 3:
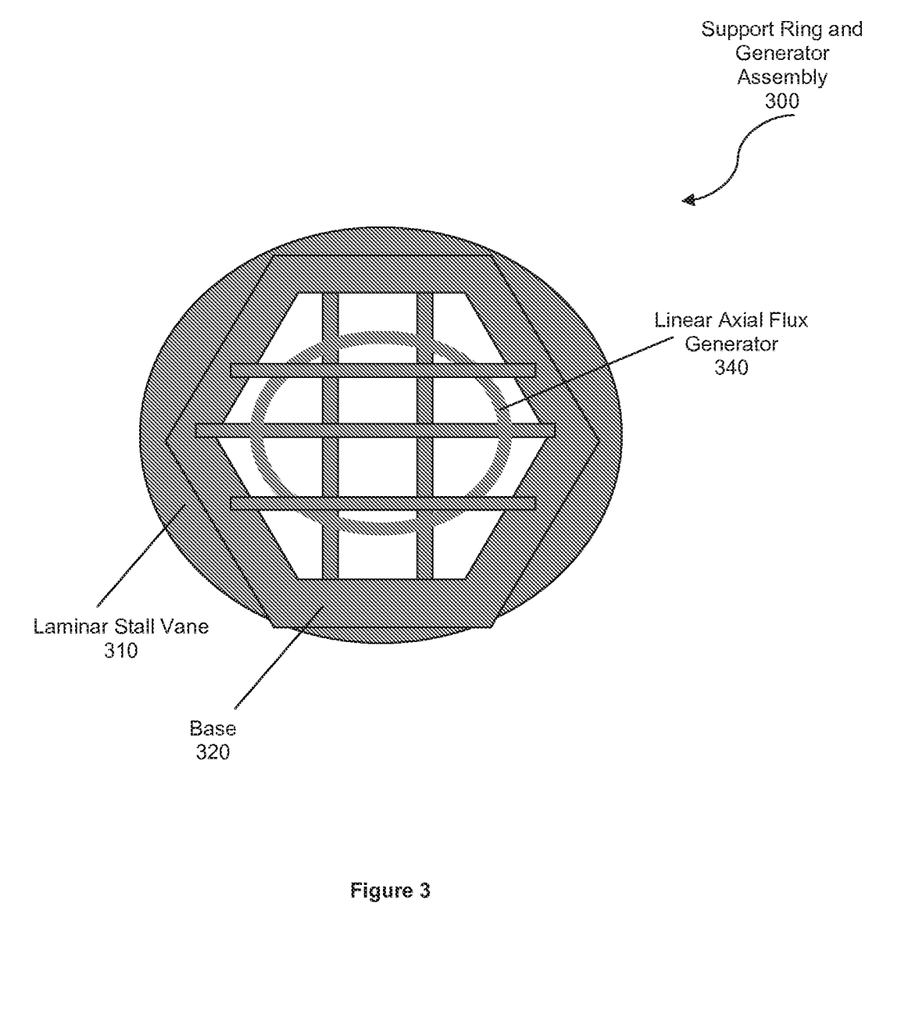
FIG. 3 is a bottom view of the wind turbine of FIG. 1, showing a laminar stall vane and generator assembly of the inventive subject matter.

FIG. 3 is a bottom view of a wind turbine's bottom laminar stall vane and generator assembly 300. Laminar stall vane and generator assembly 300 includes a laminar stall vane 310 (similar to second laminar stall vane 130 of FIG. 1) that is coupled to a turbine base 320, and a linear axial flux generator 340. As illustrated, the linear axial flux generator is coupled with base 320 via a mounting on an internal portion of the base 320. Additionally or alternatively, the generator 340 could be partially or completely embedded within a base.

In some embodiments, it is contemplated that a turbine could comprise a plurality of magnets (e.g., permanent magnets, electromagnets, ferromagnetism, diamagnetism, superconducting magnets) disposed on one or more of base 320 and laminar stall vane 310 and positioned adjacent one another to produce magnetic levitation of the laminar stall vane. Additional description of generator assemblies of the inventive subject matter can be found in co-pending U.S. patent application Ser. No. 14/290,741.

Figure 4:
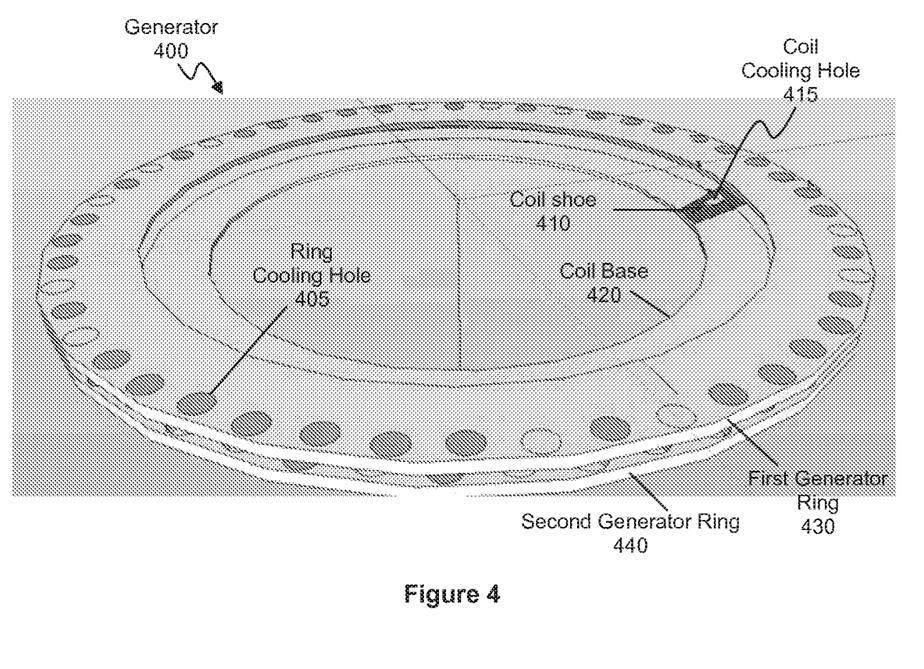
FIG. 4 is a perspective view of a generator of the inventive subject matter, which in operation would be mechanically coupled to the device of FIG. 1.

FIG. 4 illustrates a generator 400 of the inventive subject matter, which could be the same as generator 340 of FIG. 3. Generator 400 comprises first and second generator rings (430 and 440, respectively) that define a slot sized and dimensioned to hold at least a portion of coil shoe 410 that encapsulates a coil. There are magnets disposed in or on (e.g., fully encapsulated, partially encapsulated, or affixed to) each of the first and second generator rings (430, 440), which generate magnetic fields that drags electrons through the coil encapsulated in coil shoe 410 to generate a flow of electricity. Coil shoe 410 comprises a coil cooling hole 415, which can provide passive cooling to both the coil shoe 410 and coil, and is attached to (or otherwise coupled to) coil base 420, shown here as a ring. Each of first and second generator rings (430, 440) comprise a plurality of cooling holes (e.g., ring cooling hole 405), which provide passive cooling by allowing airflow through generator 400. As the foils of a turbine are rotated, the laminar stall vanes and generator coupled thereto are also rotated to generate electricity. In some other embodiments, it is contemplated that a generator could comprise two rows of magnets disposed on a single generator ring having a slot or recess.

An interesting feature of turbines of the inventive subject matter is that most of the incident wind is deflected away from the center, rather than inwards.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One should appreciate that the disclosed techniques provide many advantageous technical effects including providing a turbine with improved efficiency and having foil design and geometry that facilitates lift, torque and laminar flow along a 360 degree radial.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A circular-oriented laminar flow facilitating turbine, comprising:
    at least a leading and trailing circumferentially distributed foils, which rotate about an axis, and are sized and spaced to facilitate a laminar flow between the foils;
    the leading and trailing foils having leading edges at distances R1 and R2, respectively, from the axis,
    wherein at least the leading foil is configured such that the high pressure portion has an air brake, said air brake defined by a low pressure component aft of the chord which is configured to accelerate the laminar flow and separate a laminar boundary layer at a predetermined maximum velocity, wherein a turbulent buffeted air mass is created in front of the trailing foil;
    the leading and trailing foils having chords C1 and C2, respectively;
    the leading and trailing foils are spaced apart by a distance S;
    wherein R2 is within 10% of R1, and C2 is within 10% of C1;
    wherein R1:C1 is between 2.9 and 3.5, inclusive;
    wherein C1:S is at least 3:1, inclusive; and
    wherein the leading foil has a high pressure portion and a low pressure portion, and wherein at least 90% of the high pressure portion is curved in a manner that facilitates the laminar flow.

2. The turbine of claim 1, wherein at least one of the leading and trailing foils is wing shaped.

3. The turbine of claim 1, wherein the leading foil has angle of attack between −30 degrees and 30 degrees.

4. The turbine of claim 1, further comprising at least one laminar stall vane configured to maintain the laminar flow.

5. The turbine of claim 1, further comprising a laminar stall vane having at least a first and second cavity, wherein the first and second cavity are configured to hold the leading and trailing foils in proper relative positions and angle of attack.

6. The turbine of claim 5, further comprising a first and second magnet, wherein the first magnet is mounted on a base and the second magnet is mounted on the laminar stall vane.

7. The turbine of claim 6, wherein the first magnet is positioned adjacent to the second magnet to thereby produce magnetic levitation of the laminar stall vane.

8. The turbine of claim 7, further comprising a generator coupled to the laminar stall vane, wherein the generator comprises first and second generator rings that define a slot configured to hold at least a portion of a first coil.

9. The turbine of claim 8, wherein the first coil is attached to the base.

10. The turbine of claim 1, wherein the turbine is a vertical axis turbine.

11. The turbine of claim 1, wherein the turbine is made of a composite material.

12. The turbine of claim 1, further comprising a generator ring assembly coupled to a laminar stall vane, and including a slot sized and dimensioned to support a first coil shoe.

13. The turbine of claim 1, further comprising a magnetic linear axial flux generator at least partially embedded within a composite base.

14. The turbine of claim 13, wherein the composite base comprises a ring-shaped base, and wherein the magnetic linear axial flux generator is mounted on an internal portion of the ring-shaped base.

15. The turbine of claim 1, wherein the leading and trailing foils are shaped and positioned such that the turbine responds to a flow of fluid by spinning with a tangential velocity greater than the velocity of the fluid against the turbine.

16. The turbine of claim 1, further comprising a third foil, a fourth foil, and a fifth foil.

17. The turbine of claim 1, wherein the high pressure portions of the foils are concave, and the leading edges of the foils are configured to create micro vortices along a boundary layer on the respective low pressure portion, wherein laminar flow is maintained as a lift vector moves back and forth across the low pressure portion of the foil in rotation about the axis.

* * * * *